Oct. 16, 1934.  A. S. KNOWLTON  1,977,281
INNER TUBE AND METHOD OF MANUFACTURE
Filed Sept. 9, 1932   2 Sheets-Sheet 1
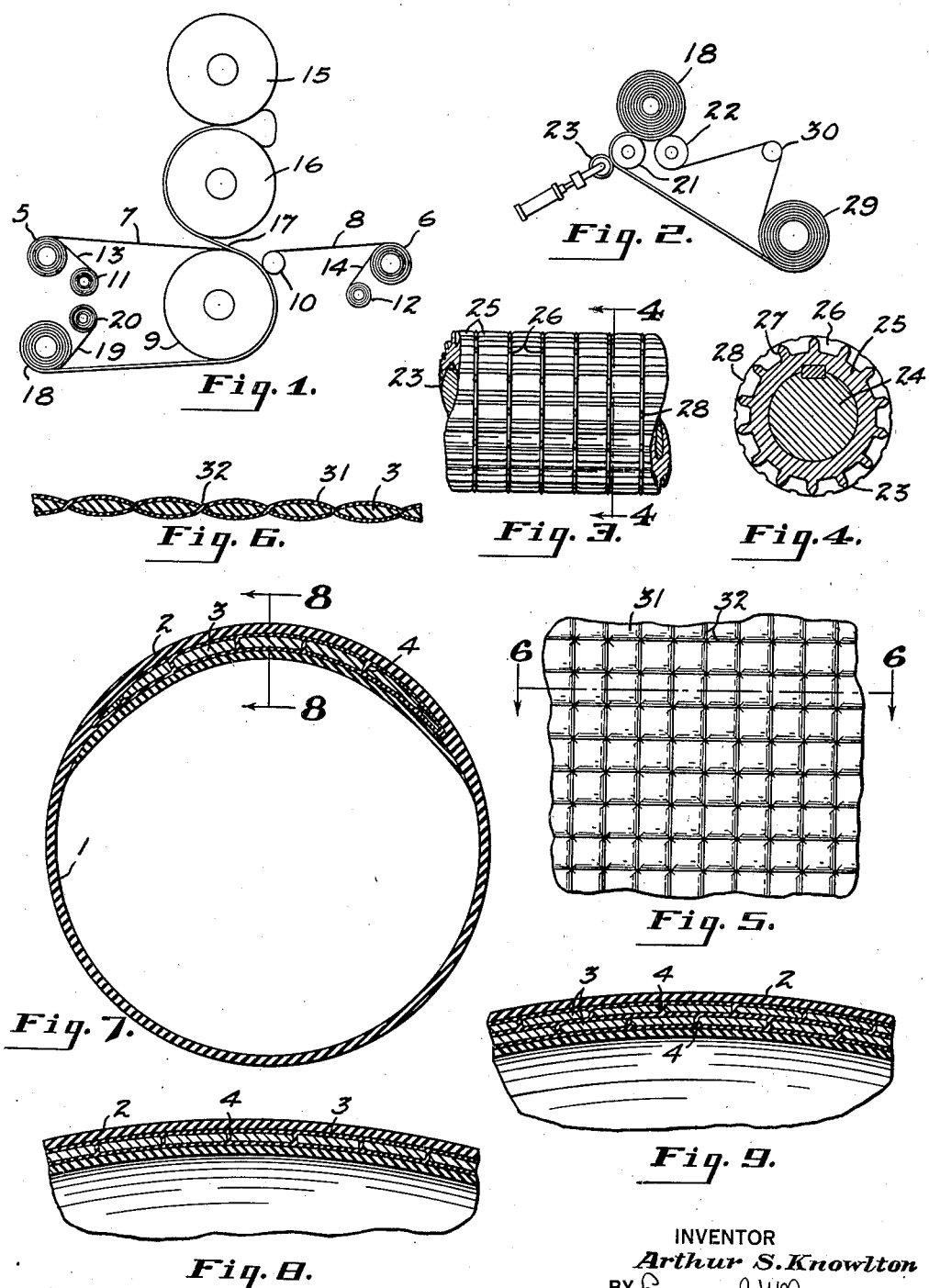
INVENTOR
*Arthur S. Knowlton*
BY
ATTORNEYS Oct. 16, 1934.    A. S. KNOWLTON    1,977,281
INNER TUBE AND METHOD OF MANUFACTURE
Filed Sept. 9, 1932    2 Sheets-Sheet 2

INVENTOR
Arthur S. Knowlton
BY Evans & McCoy
ATTORNEYS

UNITED STATES PATENT OFFICE 1,977,281

INNER TUBE AND METHOD OF MANUFACTURE

Arthur S. Knowlton, Cuyahoga Falls, Ohio, assignor to The General Tire & Rubber Company, Akron, Ohio, a corporation of Ohio Application September 9, 1932, Serial No. 632,337

6 Claims. (Cl. 154—15)

This invention relates to inner tubes for pneumatic tires, to laminated rubber stock particularly suitable for inner tubes for pneumatic tires, and to the method of making the same, and has for its object the production of elastic laminated sheet rubber stock which is cellular and in which closely spaced cells throughout the body of the stock are filled with compound of a consistency different from the body of the sheet such as a semifluid puncture sealing composition.

Inner tubes for pneumatic tires have been heretofore made which have a puncture filling composition enclosed in the tread portion of the tube. Such tubes, however, have the disadvantage that the semifluid puncture filling composition flows from one part to another of the tube during use of the tube in a tire casing, or even during the storage, handling, or shipping of the tube while uninflated. If a car using tubes of this character is left standing for some time the weight of the car on the road-engaging part of the tube causes the puncture-sealing material to flow away from the weight-carrying portion of the tube and this results in bumps and flat places forming in the tube that greatly interfere with the riding properties of the tires. When this condition once develops in a tube, uniform distribution of the puncture-sealing material cannot be again obtained. If such tubes are handled when uninflated or packed in uninflated condition, there is a tendency to form creases at the fold lines where the puncture-filling composition is squeezed out. It is common practice to pack and ship such tubes inflated, but even then the puncture-filling material tends to flow by gravity away from one portion to another of the tread of the tube, leaving an insufficient amount of puncture-filling material in such portions of the tube tread. Any displacement of the puncture-sealing material produces bumpy tubes that are much heavier over some portions than over other portions and this bumpy and unbalanced condition of the tube throws the tire out of balance and results in all of the incident disadvantages in addition to the bumpy riding that results.

The present invention has for an important object to provide an inner tube having puncture-sealing material in its tread portion that will not become displaced from any cause, thereby greatly improving the riding properties of such tubes and reducing the cost of handling and shipping the tubes as well as providing a greatly superior puncture sealing tube for use in pneumatic tire casings.

A further object of the invention is to provide tread stock which contains puncture-filling composition that is sufficiently fluent to fill a puncture and which is so retained within the tread stock that displacement of the sealing material is prevented while the tube is in use and so dispersed throughout the tread portion of the tube that upon puncture at any point of the tube tread only the small quality of the sealing composition necessary to seal the puncture is released.

Another object of the invention is to produce, as an article of manufacture, elastic, laminated, sheet rubber stock having closely spaced cells filled with a compound of a character different from the rubber sheet stock making up the body portion of the article.

A further object is to provide such laminated stock in the form of a strip or of a ring adapted to be adhesively secured upon the periphery of a previously formed inner tube of conventional character.

An additional object of this invention is to provide an inner tube which has a tacky sealing composition retained within the tread portion of its wall, which is uniformly distributed throughout the tread portion so that, upon puncture of the wall, the sealing composition will be forced by the air pressure to which the wall is subjected in service into the puncture opening to seal the same.

A further object of the invention is to provide an inner tube in which the tread portion of the tube wall is of cellular construction, the cells being closely spaced throughout the tread portion and each cell being filled with a tacky sealing composition, preferably a non-vulcanizing rubber composition which remains fluent under pressure when air is excluded therefrom, so that upon puncture of the inner tube the sealing composition in one or more of the cells will be forced into and fill the puncture opening.

A further object of the invention is to provide a method of making cellular tread stock having its cells filled with the sealing composition and of making an inner tube with the cellular tread stock in the tread portion thereof.

With the above and other objects in view the invention may be said to comprise the inner tube and method of making the same, as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Figures 1 and 2 are diagrammatic views illustrating the method of manufacturing the cellular tread stock, Fig. 1 showing the method of forming a composite sheet comprising surface layers of thin unvulcanized sheet rubber and an intermediate layer of sealing composition, and Fig. 2 showing the method of forming the cells in the composite sheet and confining the sealing composition in the cells;

Fig. 3 is a fragmentary elevation showing the cell-forming roller;

Fig. 4 is a section taken on the line indicated at 4—4 in Fig. 3;

Fig. 5 is a fragmentary plan view showing the cellular puncture-sealing stock;

Fig. 6 is a section taken on the line indicated at 6—6 in Fig. 5;

Fig. 7 is a transverse section through a completed inner tube;

Fig. 8 is a fragmentary section taken on the line indicated at 8—8 in Fig. 7;

Fig. 9 is a sectional view similar to Fig. 8 showing a slightly modified construction;

Figure 10:
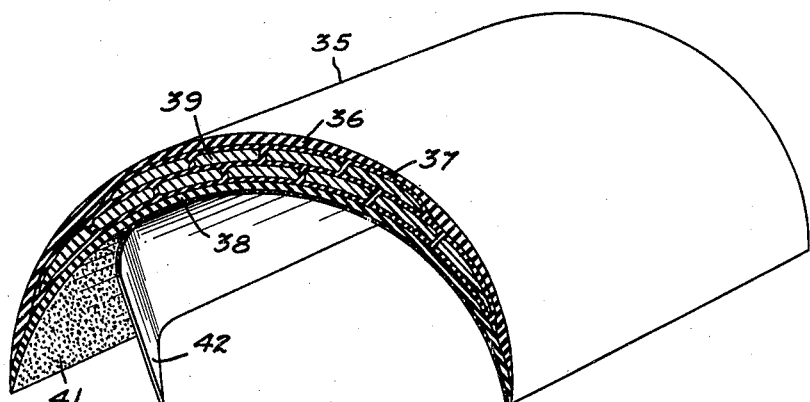
Fig. 10 is a sectional perspective showing a transversely arched strip of laminated stock adapted to conform to and be adhesively secured upon the periphery of an inner tube.

As shown in Figs. 7 and 8 of the drawings, the inner tube of the present invention has a tubular rubber wall 1 provided with a thickened tread portion 2 which is of cellular construction containing closely spaced, separately enclosed bodies 3 of a sealing composition which is preferably a non-vulcanizing rubber composition which is fluent under pressure and which will flow into and seal a puncture in the tread wall of the inner tube. The tread portion of the inner tube wall is formed with closely spaced cells containing the bodies of sealing composition and these cells are separated by transverse and longitudinal webs 4 of vulcanized rubber connecting the inner and outer portions of the tube wall.

In the manufacture of the tube a strip of cellular sheet rubber stock containing the sealing composition in the cells thereof is laid between superposed layers of sheet rubber on a suitable mandrel, endless tubes are formed by joining the ends of suitable lengths of tubing formed on the mandrel and the endless inner tubes are vulcanized in a suitable mold.

In Figs. 1 and 2 of the drawings the method of manufacturing the cellular sealing stock is illustrated. A composite strip of sheet stock having a layer of the sealing composition interposed between thin sheets of unvulcanized rubber is first formed and the composite sheet is then molded to press the unvulcanized outer layers of sheet rubber together along longitudinal and transverse lines, causing the sheet rubber to adhere along these lines and confining all of the sealing material in pockets or cells formed between the intersecting grooves pressed into the sheet.

As shown in Fig. 1, a pair of sheet rubber reels 5 and 6 deliver thin sheets 7 and 8 of unvulcanized rubber forwardly and rearwardly onto a large roll 9, the sheet 7 being fed from the reel 5 directly to the roll 9 and the sheet 8 being fed over a small roller 10 onto the roll 9 outside the sheet 7. The unvulcanized sheet rubber stock is provided with the usual fabric backing to prevent superposed layers wound on the reel from sticking together, and cloth reels 11 and 12 are provided adjacent the reels 5 and 6 to wind up the cloth strips 13 and 14 as the stock is unwound from the reels 5 and 6. Directly above the large roller 9 a pair of rubber mill rolls 15 and 16 are provided, which deliver the sealing composition in the form of a sheet 17 upon the thin rubber sheet 7 on the roll 9 rearwardly of the roller 10, which delivers the top sheet of rubber 8. The surface sheets 7 and 8 of vulcanizable rubber are united with the intermediate layer 17 of sealing composition in passing over the roll 9 and the composite sheet thus formed passes to a reel 18 where it is wound up with a backing sheet 19 delivered from an adjacent reel 20. After forming the composite sheet as above described, the composite sheet is subjected to a molding operation to confine the sealing composition in closely spaced, completely enclosed cells or pockets throughout the body of the sheet. The reel of the composite sheet is placed upon a pair of rollers 21 and 22, and as the rollers are rotated the rubber stock passes over the rollers 21 and the backing fabric over the roller 22. As the stock passes over the roller 21 it is engaged by a molding roller 23 which is pressed against the roller 21. As shown in Figs. 3 and 4 the roller 23 consists of a shaft 24 and bands 25 and thin disks 26 keyed upon the shaft 24. The bands 25 have sharp edged peripheral teeth 27 which are substantially flush with the peripheries of the disks which are clamped between adjacent bands, the ends of the teeth 27 bear against the side faces of the disks 26 and the teeth of all the bands are alined so that they form substantially continuous longitudinal ribs intersecting circumferential ribs formed by the projecting portions of the disks. The sharp edges of the ribs of the roller 23 penetrate nearly or completely through the composite sheet and force the thin unvulcanized surface layers of rubber together under pressure along the lines of engagement, causing the tacky sheet rubber to adhere along these lines and confining the sealing composition in the spaces between the intersecting lines of adhesion. In order to avoid complete severance of the stock by the disks 26 these disks may be provided with notches 28 at intervals throughout their peripheries. The ribs of the roller 23 form intersecting longitudinal and transverse grooves or indentations in the composite sheet along which the sealing composition is pressed out from between the rubber sheets which adhere together, so that the sealing stock is confined in rectangular or hexagonal cells of any desired shape which are closely spaced throughout the body of the sheet. After passing between the rollers 21 and 23 the stock is wound upon a reel 29 to which the backing cloth is fed from the roller 22 over a guide roller 30.

The cellular sheet stock 31 which is shown in Figs. 5 and 6 has intersecting transverse and longitudinal grooves 32 along the bottoms of which the sheet rubber layers are united to provide hermetically sealed cells each confining a separate body 3 of sealing composition.

In building the inner tube, one or more strips of the cellular sealing stock 31 is laid between the inner and outer layers of vulcanizable sheet rubber on a suitable mandrel, after which ends of the tubing are joined to form an endless tube which is vulcanized in a suitable mold. The sheet rubber stock is vulcanized but the sealing composition remains in the form of a tacky, sticky composition sufficiently fluent under pressure to flow into and seal a puncture.

In Figs. 7 and 8 there is shown an inner tube in which a single layer of cellular sealing stock has been employed in the tread portion. However, if desired, a plurality of layers of sealing stock may be interposed between inner and outer layers of sheet rubber in building up the tube, and where a plurality of layers are employed the grooves of superposed layers are preferably staggered to stagger the bodies of sealing composition so that it will be impossible to puncture the tube at any point in the tread portion without opening the aperture to one or more of the cells containing the sealing composition.

Figure 11:
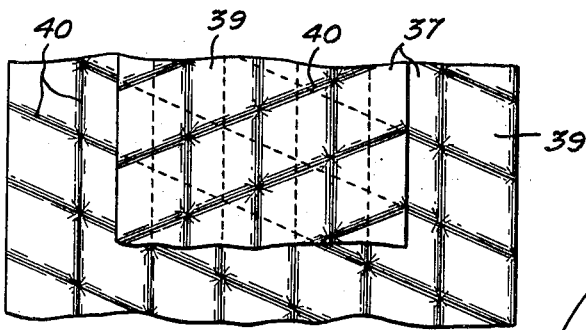
Fig. 11 is a fragmentary plan view of the strip stock shown in Fig. 10.
Figure 12:
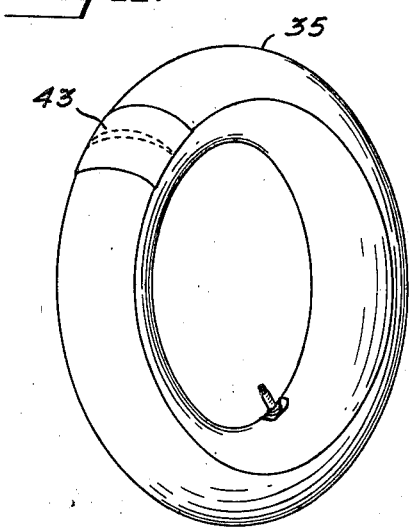
Fig. 12 is a fragmentary side elevation showing the manner of joining the ends of the strip on an inner tube.

In Figs. 10 to 12 there is shown a laminated strip 35 vulcanized to a transversely arched form to fit upon the periphery of an inner tube, the strip 35 comprises an outer layer 36 of sheet stock, intermediate layers 37 of cellular stock similar to that above described and an inner layer 38 of elastic rubber stock. The cellular stock 37 is grooved longitudinally and transversely to provide cells 39 full of puncture-sealing composition and in order to insure complete overlapping of cells in superposed layers of the cellular stock the transverse grooves 40 are preferably disposed diagonally.

In the manufacture of the strip 35 the unvulcanized sheet rubber strip which forms the outer layer 36, the laminated stock forming the inner layers 37 and the unvulcanized sheet rubber strip which forms the inner layer are superimposed one upon another and are then placed upon a cylindrical mandrel or tubular core and vulcanized.

A suitable length of the strip 35 may be laid upon the periphery of an inflated inner tube with the ends thereof abutting as shown in Fig. 11, and be secured to the inner tube by means of rubber cement. If desired, the inner face of the inner rubber layer 38 may be provided with a thin layer of slow-hardening unvulcanized rubber 41 protected by a strip of Holland cloth 42 which may be removed just prior to application of the strip to the inner tube.

In order to prevent separation of the abutting ends of a strip secured to an inner tube, a short piece of rubberized fabric 43 is preferably placed across the joint and cemented to the adjoining ends.

Figure 13:
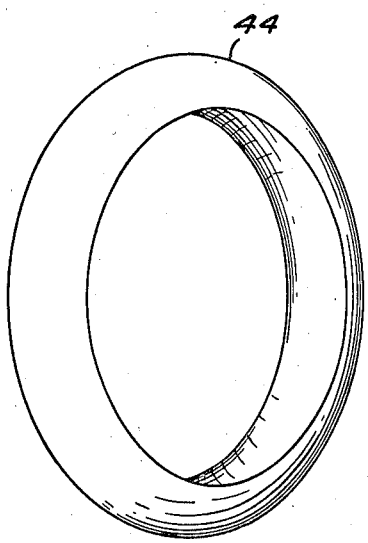
Fig. 13 is a side elevation showing a ring of tread stock vulcanized to endless form and shaped to conform to the periphery of an inner tube.

If desired, the tread stock may be cut to length prior to vulcanization and the ends joined in a suitable mold to provide, after vulcanization, a tread stock ring 44 as shown in Fig. 13 of a size and shape to fit upon the periphery of an inner tube of conventional form.

An important advantage of the cellular stock is that it can be severed straight across or diagonally along the grooves between the cells, or an additional separation of the cells may be made by using a hand roller so that the stock may be severed without opening any of the cells. The puncture-filling material, therefore, does not interfere with the splicing of the abutting ends of the stock in building up inner tubes or other articles in which the stock is used.

It will be apparent that the cellular structure, confining the sealing composition in small bodies closely spaced throughout the tread portion of the inner tube, serves to positively maintain a uniform distribution of the sealing composition throughout the tread portion during use of the tube or in the handling of the tube prior to its use, and it prevents displacement of the sealing material by pressure due to any irregularities in the surface of the tire casing against which the tread portion of the inner tube is pressed, so that a puncture in any part of the tread portion of the tube will be instantly sealed by sealing composition flowing into the opening from one or more of the adjacent cells. The walls separating adjacent cells are relatively thin and, since their resistance to puncture is much greater than the adjacent composition, articles passing into the tube are caused to pass through the cells rather than through the partitions, even when a single layer of cellular stock is used in the tube wall.

It will be apparent that the present invention provides a highly efficient, puncture-proof inner tube and a method of manufacture by which the tube can be economically made.

Furthermore, it is to be understood that the particular form of the stock or of the inner tube or tube tread unit shown and described, and the particular procedure set forth, are presented for purposes of explanation and illustration and that various modifications of the cellular stock, the inner tube, and the tube tread unit and the procedure of manufacturing the same can be made without departing from my invention as defined in the appended claims.

What I claim is:

1. An inner tube of vulcanized rubber, having a cellular tread portion formed of continuous spaced inner and outer walls and continuous circumferential and transverse webs connecting said walls and enclosing a large number of closely spaced cells, each cell being filled with a tacky rubber composition for sealing punctures.

2. The herein described method of making inner tubes which comprises forming sheet stock composed of surface layers of vulcanizable rubber and an intermediate layer of non-vulcanizing rubber sealing composition, pressing the vulcanizable layers into contact along intersecting longitudinal and transverse lines to confine the sealing composition in separate closely spaced cells, forming an annular inner tube with inner and outer layers of unvulcanized sheet rubber and interposed cellular sealing stock, and vulcanizing the tube.

3. The herein described method of forming cellular stock for use in building inner tubes, which comprises interposing a layer of a tacky non-vulcanizing rubber composition between sheets of unvulcanized rubber, pressing the sheets together and partially severing the same along intersecting lines to confine the sealing composition in closely spaced cells.

4. Tread stock for application to inner tubes comprising a strip molded to transversely arched form to conform to the periphery of an inner tube and having its top and bottom surfaces composed of elastic rubber and being provided with closely spaced internal cells each filled with a tacky puncture sealing composition.

5. A tread for application to inner tubes comprising a molded rubber ring of a size to fit upon the periphery of an inner tube and having small internal cells closely spaced throughout its circumference and filled with a tacky puncture sealing composition.

6. The method of forming cellular rubber stock having closely spaced cells filled with material that is different from the body of the stock comprising, positioning a sheet of vulcanizable rubber composition on each side of a sheet of material having different characteristics, stitching said sheets of rubber stock together along a plurality of intersecting endless lines of small width and vulcanizing said rubber composition.

ARTHUR S. KNOWLTON.